Jan. 3, 1933.　　　K. H. MÜLLER　　　1,893,434
SMOOTH FLOW COMPENSATOR
Filed Oct. 26, 1931　　2 Sheets-Sheet 1
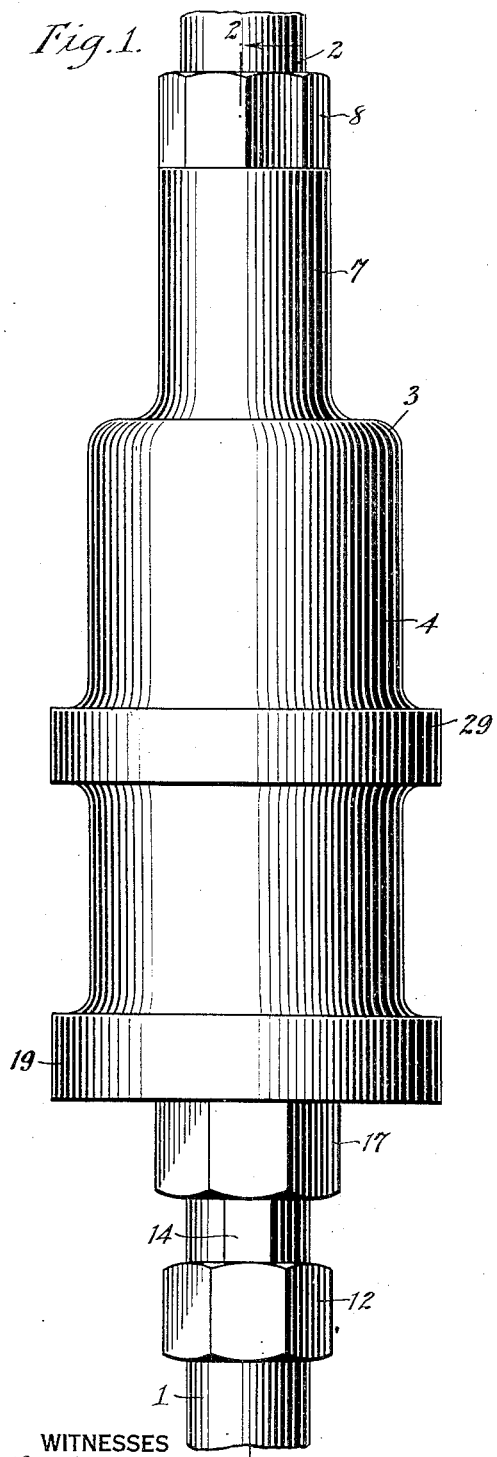
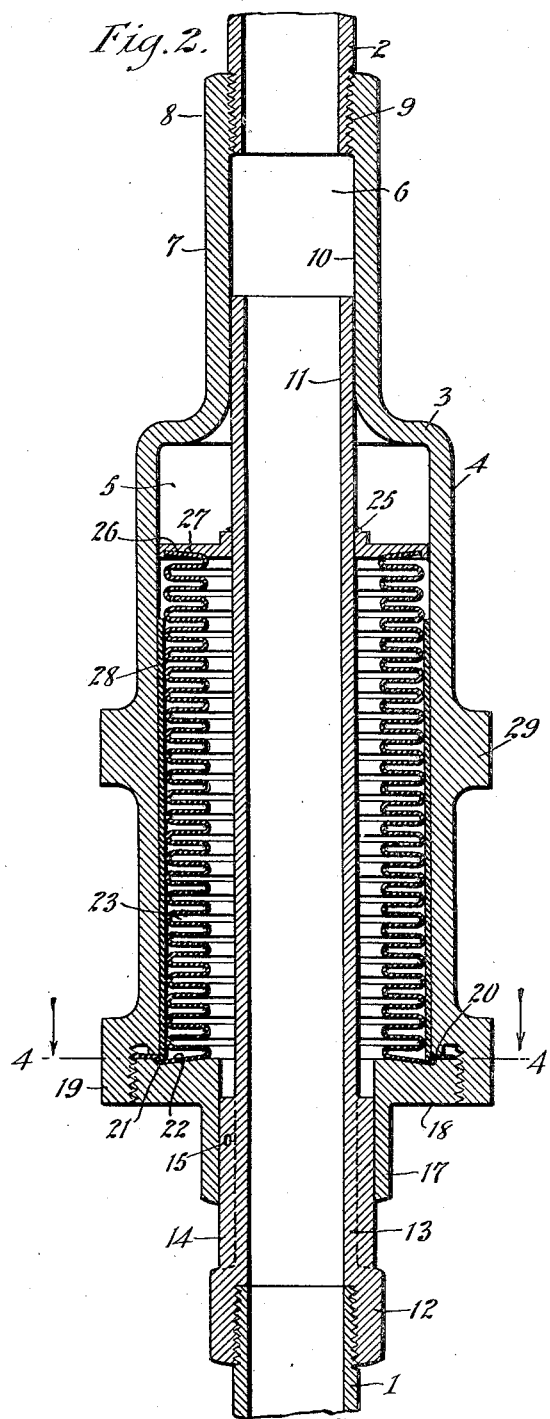
WITNESSES
Edw. Thorpe
A. L. Kitchin
INVENTOR
Karl H. Müller
BY
Munn & Co.
ATTORNEY Jan. 3, 1933.  K. H. MÜLLER  1,893,434
SMOOTH FLOW COMPENSATOR
Filed Oct. 26, 1931   2 Sheets-Sheet 2

WITNESSES
Edw. Thorpe
A. L. Kitchin.

INVENTOR
Karl H. Müller
BY
ATTORNEY

Patented Jan. 3, 1933

1,893,434

UNITED STATES PATENT OFFICE

KARL H. MÜLLER, OF BRONXVILLE, NEW YORK

SMOOTH FLOW COMPENSATOR

Application filed October 26, 1931. Serial No. 571,272.

This invention relates to expansion joints or compensators for system of pipings, and particularly, to an improved smooth flow compensator, the object being to provide a simple and substantially fool-proof structure which functions in a smooth and noiseless manner.

Another object of the invention is to provide a compensator for connecting pipes wherein an expanding bellows structure is used, but arranged to be protected against injury or high pressure.

A further object of the invention is to provide a compensator for connecting pipes wherein the parts are so arranged that the moving parts are arranged as a unit in a casing.

In the accompanying drawings—

Figure 1 is a side view of a smooth flow compensator disclosing an embodiment of the invention, the same being shown connected with top and bottom pipes.

Figure 2 is a sectional view through Figure 1 on line 2—2.

Figure 3:
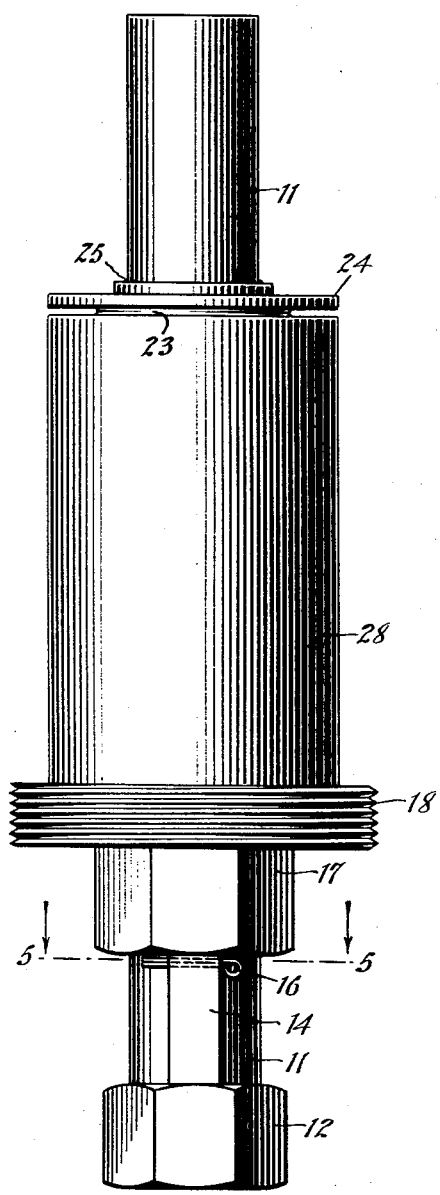
Figure 3 is a side view of the expanding unit shown in Figure 2.
Figure 4:
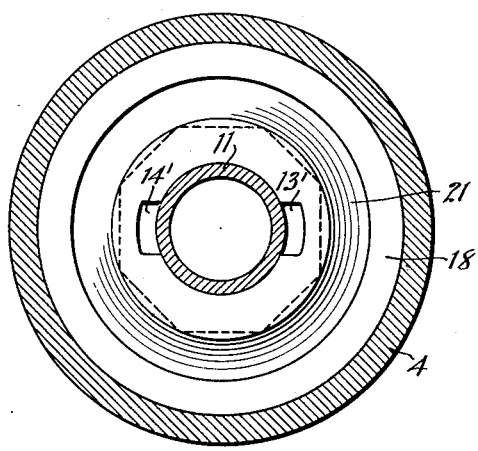
Figure 4 is a sectional view through Figure 2 on line 4—4.
Figure 5:
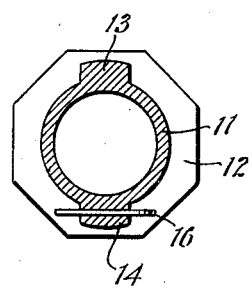
Figure 5 is a sectional view through Figure 3 on line 5—5.

Referring to the accompanying drawings by numerals, 1 and 2 indicate the respective pipes connected to the compensator 3. It will be understood that the compensator may be arranged vertically, horizontally, or at any desired angle, but for the purpose of this description, the pipes 1 and 2 will be mentioned as top and bottom pipes, and the parts will be described as being arranged vertically.

As illustrated in Figures 1 and 2, the compensator is provided with a casing 4 having chambers 5 and 6, the chamber 6 being formed by the reduced extension 7 of casing 4. The upper end of the extension 7 is preferably squared at 8, the squared portion showing an hexagon arrangement so as not to unnecessarily weaken the extension and provide for a wrench. The interior of the hexagon shaped end 8 is provided with threads 9 to receive the threaded end of pipe 2, which is screwed down thereon in any desired manner. It will be noted that the walls 10 of chamber 6 are substantially tubular so that the outer walls of a sliding tube 11 may move back and forth easily and yet there may be maintained a comparatively tight fit. The sliding tube 11 extends from chamber 6 through chamber 5 and out the lower end of the casing 4 where it is connected with the pipe 1. Adjacent the joint where the tube 11 is connected to pipe 1, a thickened hexagon shaped portion 12 is provided for the reception of a wrench. Adjacent the hexagon shaped portion 12 are provided guiding webs 13 and 14, web 14 having an aperture 15 for receiving the cotter pin 16. The lower end of the tube 11 together with the webs 13 and 14 slide in the hexagon shaped extension 17 of the end or cap 18 screwed into the enlargement 19 of the casing 4. As indicated in Figure 2, the casing 4 is provided with an annular seat 20 against which the cap 18 is forced so that the compensator will be provided with water and steam tight connection.

Also, in Figure 2, it will be seen that the cap 18 is provided with an annular recess 21 in which the extended flange 22 of the bellows 23 is positioned, and in fact is welded so that there will be a water and steam tight connection between the end of the bellows 23 and cap 18. A follower plate 24 is welded or otherwise secured at 25 to the tube 11 so as to always move with the tube. This follower is provided with an annular recess 26 for receiving the end flange 27 of bellows 23, said end flange being welded in place to provide a water and steam tight connection. A comparatively loosely mounted sleeve 28 is fitted over the bellows 23, this sleeve being of a diameter to readily slide in the casing 4.

When first assembling the device, a cotter pin 16 is inserted and then the parts assembled, as shown in Figure 3. In assembling the parts in this manner, the cap 18 is slid downwardly until the extension 17 strikes the cotter pin 16, and then the bellows is mounted thereon and welded thereto, though the welding action could take place prior, if desired. The follower 24 is then slid down to substantially the position shown in Figure 3 and welded to the tube 11 and also to the end of the bellows. It will be noted that the follower 24 has a sliding fit with the walls of chamber 25 very much in the same way that the outer surface of tube 11 has a sliding fit with the walls 10 of chamber 6. In this way sediment cannot gather, or coating of the bellows cannot take place.

As clearly shown in Figure 2, the bellows structure is completely protected, and consequently, can function freely and accurately a great length of time without danger of being broken as the maximum expansion is limited by follower 24 striking the upper end of the chamber 5 and the minimum contraction is when the follower 24 strikes the sleeve 28.

In Figure 2, the pipes 1 and 2 are threaded internally of tube 11 and extension 7, but, if desired, the thread could be made on the outside of these members and the pipes internally threaded and screwed in place without departing from the spirit of the invention.

As shown particularly in Figure 2, a smooth passage-way is provided for the flow of liquid or gases, thereby eliminating friction or other objection. It will also be noted that the structure is very substantial while being comparatively small, and consequently, may be mounted at any desired place, either within a wall or in an exposed place. After having been once installed, there is no need for adjusting, and the expansion and contraction of the pipes connected therewith will be taken care of without causing any strain or distortion. It will also be noted that the device is free from gaskets or packing, and if desired, the device could be anchored in a wall or in any desired place by providing a clamp or sleeve for gripping the thickened portion 29.

The device is, of course, assembled when it is cold or at atmospheric temperature, and also installed when the pipes are at atmospheric temperature, and for this reason, it is desired to have the tube 11 lowered to the position shown in Figure 3. In order that a workman may not make a mistake, a cotter pin 16 is always provided and after the device has been assembled and mounted as shown in Figure 3, the cotter pin 16 is removed. In case the pipe becomes warm, it will naturally expand, and consequently, tube 11 will be moved upwardly and independently of casing 4. If the pipe should become colder and contract somewhat, the movement naturally is in the opposite direction, but there is ample length to the pipe to accommodate this movement caused by contraction. Usually the device is completed and a cotter pin 16 left in place before the device leaves the factory so that all that is necessary for the steam fitter or other workmen to do is to connect pipes 1 and 2 as shown in Figure 2 and then remove the cotter pin.

It will be noted that the device is substantially fool-proof and that it is constructed without the use of bolts, nuts, screws, rivets, gaskets or other similar packing. Where packing is used care must be taken to maintain the same tight. When assembled there is nothing to get out of order so that the device may be used within a wall or any desired place, and function for an indefinite time without attention.

I claim:

1. A compensator for connecting pipes comprising a casing having a large chamber and a small chamber, the small chamber merging into the large chamber, a tube having one end slidably fitted into said smaller chamber, said tube having its outer end extending beyond said casing, a cap slidably fitted over said tube and screwed into one end of said casing, a bellows at one end being welded to said cap, a follower welded to the opposite end of said bellows, said follower being welded also to said tube, and a protecting sleeve surrounding said bellows and extending adjacent said cap to near said follower.

2. A compensator for devices including a casing, a cap screwed into one end of said casing formed with a round passage-way, said passage-way being provided with a pair of oppositely extending grooves, a tube slidably mounted in said casing, one end extending through said passage-way and substantially filling the passage-way, said end having webs slidably fitted into one of said grooves, one of said webs having an aperture, a pin removably mounted in said aperture and a bellows operatively connected at one end to said cap and with the other end connected with said tube.

3. A compensator for connecting pipes including a casing having a large chamber and a small chamber, said chambers merging, said casing being open at both ends, the end of the larger chamber being threaded and an expansion unit removably mounted in said casing, including a cap adapted to be screwed into the threaded end of said casing, a tube slidably mounted in said cap, said tube extending to and slidingly fitting in said small chamber, a bellows connecting said cap and said tube, and a protecting sleeve surrounding said bellows.

KARL H. MÜLLER.